Figure 1:
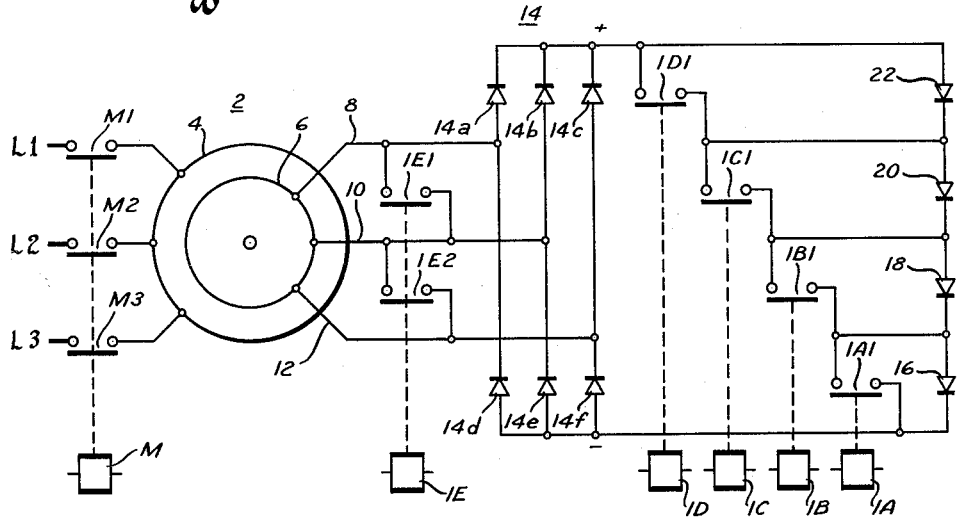

Jan. 16, 1962  P. M. FISCHER  3,017,554
ALTERNATING CURRENT MOTOR CONTROL SYSTEMS
Filed July 25, 1960  2 Sheets-Sheet 1

Inventor
Paul M. Fischer
By Wm. A. Autio
H. Worney

United States Patent Office 3,017,554
Patented Jan. 16, 1962

3,017,554
ALTERNATING CURRENT MOTOR CONTROL SYSTEMS
Paul M. Fischer, Elm Grove, Wis., assignor to Cutler-Hammer, Inc., Milwaukee, Wis., a corporation of Delaware
Filed July 25, 1960, Ser. No. 45,213
18 Claims. (Cl. 318—239)

This invention relates to alternating current motor control systems and more particularly to systems for controlling the speed of alternating current motors.

While not limited thereto, the invention is especially applicable to automatic regulation of the speeds of alternating current induction motors of the wound rotor slip-ring type.

In the control of induction motors of the wound rotor slip-ring type, it has been the usual practice to adjust the speed by varying the value of resistance connected to the secondary winding, such resistance being linear and being usually adjusted in steps by means of contactors or the like. However, the motor speed at any selected speed point is subject to variation in response to a varying load. Therefore, it has become necessary to regulate the speed at a selected value to maintain the speed as nearly constant as is possible under a varying load. An example of a regulating system employed heretofore is a system wherein the secondary current is rectified and compared against the output voltage of a direct current generator. The speed of the motor and the regulating range are selected by adjusting the output voltage of the direct current generator. Then, any tendency on the part of the motor to slow down in response to increase in load, for example, would cause an increase in current flow from the secondary winding into the generator, thus to develop more torque and to maintain the motor speed substantially constant at the selected value.

It has been found desirable to provide a non-linear secondary resistance control system for an induction motor of the slip-ring type which affords adjustable speed control and speed regulation under varying load. It has been found desirable to provide such control system which is significantly superior in speed regulation performance to the aforementioned adjustable speed controller employing linear secondary resistors and simpler and more economical in construction than the aforementioned generator type regulator.

An object of the invention is to provide improved means for adjusting and regulating the speed of an alternating current motor.

A more specific object of the invention is to provide improved automatically operable means for regulating the speed of an adjustable speed induction motor of the slip-ring type.

Another specific object of the invention is to provide improved motor secondary networks employing varistors to afford selective speed control and for automatically regulating the speed at the selected value of an induction motor of the slip-ring type.

Another object of the invention is to provide improved secondary control systems for an induction motor of the slip-ring type which are simple and economical in construction and afford better speed regulating performance.

According to the invention, there are provided improved secondary networks which may be adjusted in steps to control and adjust the speed of an induction motor of the slip-ring type. The secondary network is provided with semi-conductor elements of the non-linear resistance type having a significant negative, voltage coefficient to resistance known as varistors. The negative, voltage coefficient of resistance affords a relatively steep current-voltage characteristic for the motor secondary network as compared to the characteristic of conventional linear resistors thereby to afford improved automatic regulation of the motor speed. These varistors or groups thereof are connected in or shunted from the secondary circuit to adjust the speed of the motor. Due to the steep slope on the varistor characteristic, a decrease in motor speed in response to an increase in load causes a substantially large increase in torque to regulate the motor speed.

Figure 3:
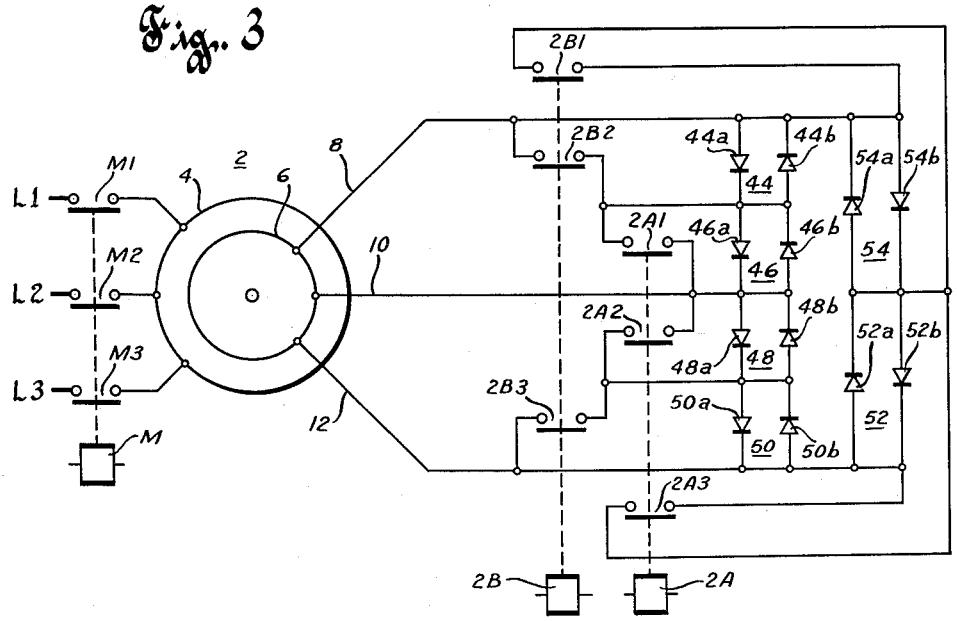
Figure 2:
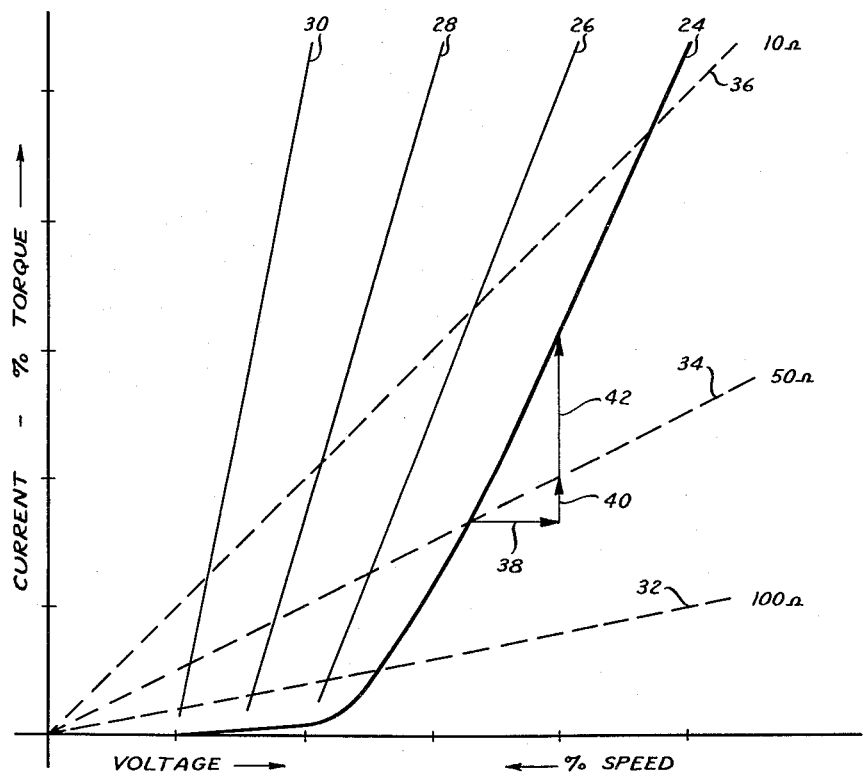
Figure 4:
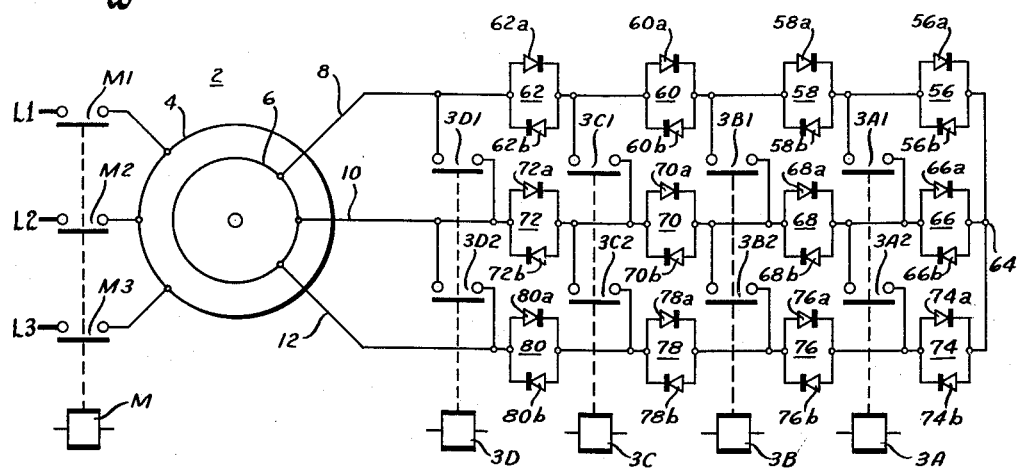

The above mentioned and other objects and advantages of the invention and the manner of obtaining them will become more apparent and the invention itself will be best understood by reference to the following description of embodiments thereof taken in conjunction with the accompanying drawings, wherein:

FIGURE 1 diagrammatically shows a motor and secondary control system constructed in accordance with the invention;

FIG. 2 is a graphical illustration of the non-linear operating characteristics of the varistor devices of the invention in comparison with the characteristics of conventional linear secondary resistors;

FIG. 3 diagrammatically shows a modified motor secondary control system having a delta arrangement; and FIG. 4 diagrammatically shows another modified secondary control system having a star arrangement.

Referring to FIG. 1, there is shown an alternating current induction motor 2 of the wound rotor slip-ring type having its primary or stator winding 4 connectable through normally open contacts M1, M2 and M3 of a contactor M and power supply lines L1, L2 and L3 to a suitable three-phase power supply source. The operating coil of contactor M may be energized from one phase of the source in a suitable manner to close the contacts and to energize the motor. The secondary or rotor winding 6 is connected through conductors 8, 10 and 12 to the input terminals of a three-phase full-wave rectifier bridge 14 comprising diodes 14a, 14b, 14c, 14d, 14e and 14f. The positive output terminal of rectifier bridge 14 is connected through a plurality of non-linear resistance elements or varistors such as diodes 22, 20, 18 and 16 in series to the negative output terminal of the rectifier bridge. A plurality of normally open contacts 1A1, 1B1, 1C1 and 1D1 of speed control contactors 1A, 1B, 1C and 1D are connected across diodes 16, 18, 20 and 22, respectively, for shunting the latter. Normally open contacts 1E1 and 1E2 of a speed control contactor 1E are connected between conductors 8 and 10 and 10 and 12, respectively, between secondary winding 6 and rectifier bridge 14 to shunt the latter effectively out of the motor secondary winding and to short the secondary winding. The operating coils of contactors 1A, 1B, 1C, 1D and 1E may be energized from one phase of the power supply source in a suitable sequence in known manner to accelerate or decelerate the motor.

Diodes 16, 18, 20 and 22 are comprised of elements the resistance of which varies non-linearly in response to change in the secondary current flowing therethrough. These elements are non-linear resistors or varistors and have a negative voltage coefficient of resistance whereby the resistance thereof changes from a high value at low voltage thereacross to a low value at high voltage thereacross.

Referring to FIG. 2 wherein current and percent motor torque values are plotted against voltage and percent speed values, respectively, solid line curves 24, 26, 28 and 30 illustrate resistance characteristics of decreasing numbers of varistors in the secondary circuit. For example, curve 24 shows the resistance characteristics of all the varistors or groups thereof in the circuit, curve 26 represents the resistance characteristics after one varistor or group thereof has been shunted, etc. It will be apparent from FIG. 2 that at low voltage the resistance of the varistors is high so that only a small amount of current flows therethrough. As the voltage is increased above a predetermined value, the resistance abruptly begins to decrease and decreases at a faster rate with further increase in voltage as shown by the upper portion of curve 24 and curves 26, 28 and 30.

In FIG. 2, broken line curves 32, 34 and 36 illustrate resistance characteristics for several different values of conventional linear resistors, for example 100, 50 and 10 ohms employed in motor secondary networks. Referring to curve 34, for example, it will be apparent that for a given decrease in speed 38, the secondary current increases a relatively small amount 40. As a result, with conventional linear secondary resistors motor speed regulation is inadequate and the motor will not maintain a constant speed under varying load. On the other hand, use of varistors according to the invention affords significantly better speed regulation under varying load. Referring to curve 24, for example, such given decrease in speed in response to increase in motor load causes the secondary current and consequently the torque to increase a substantially larger amount 42. As a result, any change in speed causes an immediate change in motor torque to bring the speed toward the selected value. In other words, with the use of varistors in the secondary circuit, a change in speed will be reflected sooner in a compensating change in torque and the system will respond to smaller changes in speed to maintain motor rotation under varying load. Where a conventional system might stall under load change, the non-linear system according to the invention develops the required torque with only a slight decrease in speed.

It will be apparent from FIG. 2 that at slow motor speeds with more resistance in the secondary circuit, conventional resistors afford still poorer speed regulation as shown by the slope of curve 32. On the other hand, varistors according to the invention afford characteristic curves having much steeper slopes at low speeds. Moreover, the slopes of the varistor curves are steeper at all values of resistance than are the slopes of the conventional linear resistor curves.

Diodes 16, 18, 20 and 22 in FIG. 1 are preferably solid element selenium rectifier diodes poled to conduct in their forward direction. A desirable characteristic which these diodes should have for speed regulation purposes according to the invention is directly opposite to the characteristics required for rectification purposes. For example, the lower the initial forward resistance, the better the element is for rectification purposes. However, the higher the initial forward resistance, the better the element is for slip-ring motor speed regulation. Consequently, these elements can be manufactured at less cost without the accurate controls required to obtain good rectification.

When the operating coil of main power contactor M is energized in FIG. 1, contacts M1, M2 and M3 close to connect power to the motor primary winding to start the motor. Current flows from the secondary winding through conductor 8, diode 14a, varistors 22, 20, 18 and 16, diode 14e and conductor 10 back to the secondary winding. Similarly, current flows during the other two phases of the secondary voltage from conductor 10 through diode 14b, the varistors and diode 14f to conductor 12 and from conductor 12 through diode 14c, the varistors and diode 14a to conductor 8. Thus, a unidirectional voltage is applied from the output terminals of rectifier bridge 14 across the series connected varistors in the forward direction of the latter.

To accelerate the motor, contactors 1A, 1B, 1C, 1D and 1E are energized consecutively. As a result, contacts 1A1, 1B1, 1C1 and 1D1 shunt varistors 16, 18, 20 and 22, respectively, in sequence to decrease the secondary resistance in steps to accelerate the motor. Thereafter, contacts 1E1 and 1E2 shunt rectifier bridge 14 effectively out of circuit and short circuit the motor secondary winding.

While four varistor elements have been shown in FIG. 1, to illustrate the invention, it will be apparent that any desired number of such elements or groups thereof may be connected in series as shown, the total number employed for a particular motor being dependent upon the value of secondary voltage. At each speed point, the varistors 16, 18, 20 and 22 which are in circuit effectively regulate the motor speed if the load varies. Diodes 14a through 14f in the rectifier bridge are preferably of the silicon type to rectify the secondary voltage and to apply a rectified voltage across the varistors. Alternatively, selenium rectifiers could be employed in place of the silicon diodes 14a through 14f to afford speed regulation at the high speed when varistors 16 through 22 are shunted from the circuit. However, use of silicon diodes in the rectifier bridge is preferred when a smaller final speed step is required, silicon diodes having a lower forward voltage drop of the order of one to one and one-half volts than selenium diodes which have a forward voltage drop of the order of eight volts for each branch of the rectifier bridge. This permits the motor speed to increase to a higher value before all the rectifiers are shunted.

The modification shown in FIG. 3 is similar to the system of FIG. 1 except that a rectifier bridge has not been used and groups of varistors are connected to the motor secondary winding in delta arrangement, each such group of varistors having a plurality of subgroups thereof connected in series and each such subgroups having at least two varistors connected in reverse-parallel arrangement. Reference characters like those in FIG. 1 are employed for like parts.

Conductor 8 is connected through a group of varistors comprising subgroups 44 and 46 in series to conductor 10. Varistors 44a and 46a of subgroups 44 and 46, respectively, are poled in one direction and varistors 44b and 46b of the respective subgroups are poled in the other direction. Conductor 10 is connected through a similar group of varistors comprising subgroups 48 and 50 in series to conductor 12. Varistors 48a and 50a of subgroups 48 and 50, respectively, are poled in one direction and varistors 48b and 50b of the respective subgroups are poled in the other direction. Conductor 12 is connected through a similar group of varistors comprising subgroups 52 and 54 in series to conductor 8. Varistors 52a and 54a of subgroups 52 and 54, respectively, are poled in one direction and varistors 52b and 54b of the respective subgroups are poled in the other direction.

Speed control contactors 2A and 2B are each provided with three normally open contacts 2A1, 2A2, 2A3 and 2B1, 2B2, 2B3 for shunting a subgroup of varistors from each phase of the secondary network. Thus, contacts 2A1, 2A2 and 2A3 are connected across varistor subgroups 46, 48 and 52, respectively. Contacts 2B1, 2B2 and 2B3 are connected across varistor subgroups 54, 44 and 50, respectively.

When the operating coil of main power contactor M is energized in FIG. 3, contacts M1, M2 and M3 close to connect power to primary winding 4 of motor 2 to start the motor. Current flows from conductor 8 through varistors 44a and 46a to conductor 10 and through varistors 54b and 52b to conductor 12. Current also flows from conductor 10 through varistors 48a and 50a to conductor 12 and through varistors 46b and 44b to conductor 8. Current further flows from conductor 12 through varistors 52a and 54a to conductor 8 and through varistors 50b and 48b to conductor 10. Current flows through the aforementioned varistors in overlapped repetitive sequence according to the three-phase voltage of the secondary winding.

To accelerate the motor, the operating coil of contactor 2A is energized to close contacts 2A1, 2A2 and 2A3 and shunt varistor subgroups 46, 48 and 52 effectively from the circuit. To accelerate the motor further, the operating coil of contactor 2B is energized to close contacts 2B1, 2B2 and 2B3 to shunt the remaining varistor subgroups out of the circuit and to short circuit the motor secondary winding. At each speed step, the varistors in the secondary circuit afford speed regulation if the load varies. While only two speed steps have been shown in FIG. 3, it will be apparent that any desired number of speed steps and subgroups of varistors may be employed in the respective secondary phases.

The modification shown in FIG. 4 is similar to the system in FIG. 3 except that the groups of varistors are connected to the motor secondary winding in star relation, each such group of varistors having a plurality of subgroups thereof connected in series and each such subgroup having at least two varistors connected in reverse-parallel relation. Reference characters like those in FIGS. 1 and 3 are employed for like parts.

A first group of varistors comprising subgroups 56, 58, 60 and 62 in series is connected between a common point 64 and conductor 8. A second group of varistors comprising subgroups 66, 68, 70 and 72 in series is connected between common point 64 and conductor 10. And a third group of varistors comprising subgroups 74, 76, 78 and 80 is connected between common point 64 and conductor 12. Thus, the three groups of varistors are connected through conductors 8, 10 and 12 to motor secondary winding 6 in star arrangement. Varistors 56a, 58a, 60a and 62a of subgroups 56, 58, 60 and 62, respectively, are poled in one direction and varistors 56b, 58b, 60b and 62b of the respective subgroups are poled in the opposite direction. Varistors 66a, 68a, 70a and 72a of subgroups 66, 68, 70 and 72, respectively, are poled in one direction and varistors 66b, 68b, 70b and 72b of the respective subgroups are poled in the opposite direction. Varistors 74a, 76a, 78a and 80a of subgroups 74, 76, 78 and 80, respectively, are poled in one direction and varistors 74b, 76b, 78b and 80b of the respective subgroups are poled in the opposite direction.

Speed control contactor 3A is provided with normally open contacts 3A1 and 3A2 for shunting a first subgroup of varistors from each group thereof. Contactor 3B is provided with normally open contacts 3B1 and 3B2 for shunting a second subgroup of varistors from each group thereof. Contactor 3C is provided with normally open contacts 3C1 and 3C2 for shunting a third subgroup of varistors from each group thereof. And contactor 3D is provided with normally open contacts 3D1 and 3D2 for shunting the last subgroup of varistors from each group thereof and for short circuiting the motor secondary winding.

When the operating coil of main power contactor M is energized, contacts M1, M2 and M3 close to start the motor. Secondary current flows from conductor 8 through varistors 62a, 60a, 58a and 56a to common point 64 and then through varistors 66b, 68b, 70b and 72b to conductor 10 and through varistors 74b, 76b, 78b and 80b to conductor 12. Secondary current also flows from conductor 10 through varistors 72a, 70a, 68a and 66a to common point 64 and then through varistors 74b, 76b, 78b and 80b to conductor 12 and through varistors 56b, 58b, 60b and 62b to conductor 8. Secondary current further flows from conductor 12 through varistors 80a, 78a, 76a and 74a to common point 64 and then through varistors 56b, 58b, 60b and 62b to conductor 8 and through varistors 66b, 68b, 70b and 72b to conductor 10.

To accelerate the motor, the operating coil of contactor 3A is energized to close contacts 3A1 and 3A2 to shunt varistor subgroups 56, 66 and 74 out of the secondary circuit. Similarly, consecutive energization of the operating coils of contactors 3B, 3C and 3D causes closure of contacts 3B1, 3B2 and 3C1, 3C2 and 3D1, 3D2 to shunt varistor subgroups 58, 68, 76 and 60, 70, 78 and 62, 72, 80, respectively, out of the secondary circuit further to accelerate the motor, contacts 3D1 and 3D2 short circuiting the motor secondary winding.

At each speed point, the varistor subgroups in the circuit function as hereinbefore described to regulate the motor speed under varying load. While four accelerating contactors have been shown in FIG. 4, it will be apparent that additional contactors and varistor subgroups in each group thereof may be provided and connected in a similar manner.

Essential features of the invention reside in the use of varistors in place of the conventional linear resistors in the secondary circuit of an induction motor of the slip-ring type. These varistors have a non-linear resistance characteristic such that the resistance is relatively high at low voltage and decreases with increase in voltage such that the current-voltage characteristic has a relatively steep slope compared to the characteristic of conventional linear resistors thereby to afford better speed regulation under varying motor load. While the varistors used in the invention are preferably of the selenium semi-conductor type, the invention contemplates the use of varistors of other materials having similar characteristics, namely, a large negative, voltage coefficient of resistance such as thyrite, for example. These varistor elements such as the selenium type have a unidirectional character. However, they do not have to have a unidirectional character for purposes of the invention because the magnitude of reverse voltage required to render the same conducting is not important so long as it is more than the magnitude of the forward voltage required to render the same conducting. The use of varistors according to the invention permits a reduction in the number of speed steps from that required with conventional linear secondary resistors because the varistors afford better speed regulation at each selected speed point. The delta arrangement of FIG. 3 and the star arrangement of FIG. 4 have certain advantages over one another for specific uses. For example, for a given motor secondary voltage, the delta arrangement of FIG. 3 affords more voltage across each varistor element and less current therethrough than in the star arrangement whereas the star arrangement of FIG. 4 affords less voltage across each varistor element and more current therethrough than in the delta arrangement. However, in both modifications such voltages and currents are dependent upon the number of varistors connected in series and upon the secondary voltage. The arrangement shown in FIG. 1 has certain advantages over the arrangements of FIGS. 3 and 4 in that use of the rectifier bridge prevents application of a reverse voltage on the varistor elements and thereby minimizes increase in their forward resistance over a period of time.

While the systems hereinbefore described are effectively adapted to fulfill the objects stated, it is to be understood that I do not intend to confine my invention to the particular preferred embodiments of induction motor speed control and regulating systems disclosed, inasmuch as they are susceptible of various other modifications without departing from the scope of the appended claims.

I claim:

1. In a motor control system, an alternating current induction motor of the slip-ring type having a primary winding and a secondary winding, varistor means connected to said secondary winding for conducting the secondary current therethrough, said varistor means having a predetermined value of resistance for a given secondary voltage to control the speed of the motor to drive a load subject to variation, and said varistor means being of a type having a significant negative, voltage coefficient of resistance for regulating the motor speed under varying load.

2. The invention defined in claim 1, wherein said varistor means comprises a plurality of solid element semi-conductor devices connected in series, and means for shunting said semi-conductor devices in sequence to adjust the speed of the motor, said serially-connected semiconductor devices having a non-linear voltage-current characteristic such that the resistance thereof is high at low voltage and low at high voltage.

3. The invention defined in claim 1, wherein said varistor means comprises a plurality of semi-conductor devices connected in series, said serially-connected semi-conductor devices having a non-linear voltage-current characteristic such that the resistance thereof is high at low secondary voltage thereacross and the resistance thereof is low at high secondary voltage thereacross and the resistance thereof decreases at a relatively slow rate as the voltage is increased in the low range thereof and decreases at a relatively fast rate as the voltage is increased in a high range thereof.

4. The invention defined in claim 3, wherein said semiconductor devices have a non-linear characteristic such that the resistance thereof decreases at said fast rate as the voltage thereacross increases within the operating speed range of the motor.

5. The invention defined in claim 4, wherein said semiconductor devices have a non-linear characteristic such that the resistance thereof abruptly begins to decrease at said fast rate at a predetermined low voltage.

6. The invention defined in claim 1, wherein said varistor means comprises a plurality of selenium diodes connected in series and parallel combination for increased resistance and current capacity respectively.

7. In a control system for an alternating current induction motor of the slip-ring type having a primary winding energizable from a power supply source and a secondary winding, a network connected to the secondary winding for controlling the speed of the motor, said secondary network comprising a plurality of varistor devices for conducting the secondary current therethrough, and said varistor devices having a negative, voltage coefficient of resistance to control the motor torque and thereby to regulate the motor speed under varying load.

8. In a motor control system, an alternating current induction motor of the wound rotor slip-ring type having a plural-phase primary winding energizable from a plural-phase power supply source and a plural-phase secondary winding, a plurality of varistor devices, means connecting said plurality of varistor devices to the secondary winding to conduct secondary current therethrough, and said varistor devices having a negative, voltage coefficient of resistance to maintain the motor speed substantially constant under varying load.

9. The invention defined in claim 8, wherein said connecting means comprises a plural-phase full-wave rectifier network having its input terminals connected to the plurality of phases of the secondary winding and having its output terminals connected to said varistor devices, and said varistor devices being connected in series between the positive and negative output terminals of said rectifier network.

10. The invention defined in claim 9, wherein said varistor devices comprise solid element diodes of the semiconductor type connected to the output terminals of said rectifier networks for conduction in their forward direction.

11. The invention defined in claim 10, together with means for selectively shunting said varistor devices to control the speed of the motor.

12. The invention defined in claim 11, wherein said rectifier network comprises a plurality of varistor devices of the unidirectional conducting type for rectifying the secondary voltage applied to the first mentioned varistor devices, said unidirectional varistor devices having a negative voltage coefficient of resistance for regulating the motor speed under varying load when said first mentioned varistor devices are shunted, and means for shunting said rectifier network to short circuit the secondary winding.

13. The invention defined in claim 8, wherein said plurality of varistor devices comprises a plurality of groups thereof equal in number to the number of secondary phases with a plurality of subgroups of varistor devices in each such group thereof, and said connecting means comprises means connecting said groups of varistor devices in delta arrangement to said plural-phase secondary winding.

14. The invention defined in claim 13, together with means for selectively shunting subgroups of said varistor devices from the plurality of groups thereof to control the speed of the motor.

15. The invention defined in claim 14, wherein each said subgroup comprises at least two varistor devices connected in parallel reverse conducting relation.

16. The invention defined in claim 8, wherein said plurality of varistor devices comprises a plurality of groups thereof equal in number to the number of motor secondary phases, there being a plurality of subgroups of varistor devices in each such group thereof, and said connecting means comprises means connecting said groups of varistor devices in star arrangement to said plural-phase secondary winding.

17. The invention defined in claim 16, together with means for consecutively shunting subgroups of the varistor devices from the plurality of groups thereof to control the motor speed.

18. The invention defined in claim 17, wherein each said subgroup comprises at least two varistor devices connected in parallel reverse conducting relation with respect to one another.

No references cited.